2,986,940
SAMPLING DEVICE

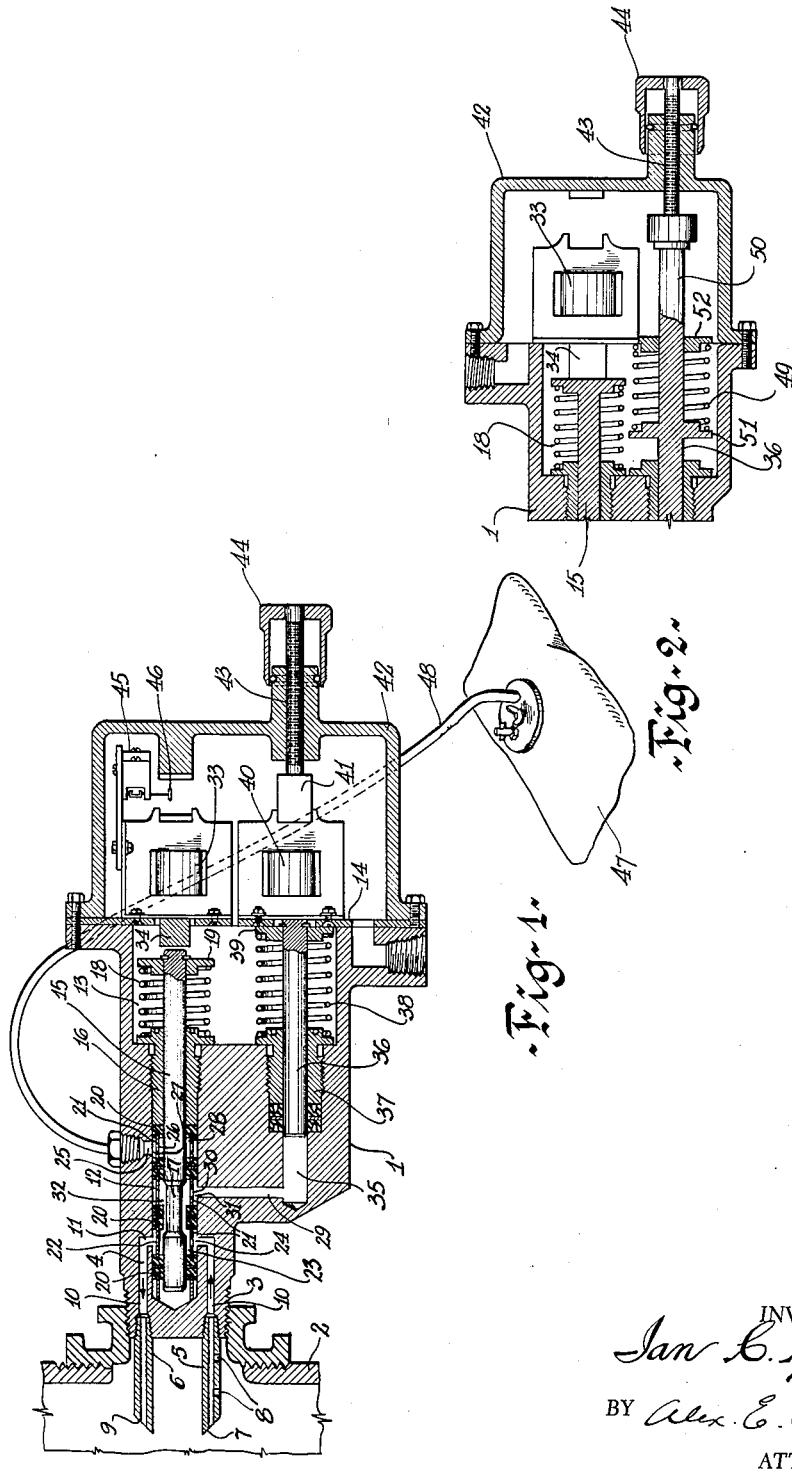

Ian C. Russell, Edmonton, Alberta, Canada, assignor of one-half to Barber Machinery Limited and one-half to Engineered Oil Controls Ltd., both of Edmonton, Alberta, Canada
Filed Dec. 22, 1958, Ser. No. 782,154
6 Claims. (Cl. 73—422)

This invention relates to sampling devices.

In the treatment or refining of various liquids, the need for continuous automatic sampling of the liquid in the supply line is now recognized as a fundamental requirement. This is particularly true in the petroleum industry, and various types of automatic samplers for this purpose have heretofore been proposed.

It is an object of this invention to provide a sampler which may be mounted directly and conveniently on a liquid supply line; which operates satisfactorily under all conditions with a minimum of equipment; which provides a constant flow of fresh liquid, which will provide samples from lines of various sizes without extra cost; the structure of which minimizes damage from abrasives in the fluid; in which the sample volume may be easily regulated; and which provides long service with a minimum of mechanical maintenance.

The invention contemplates the provision of a sampling device for liquid supply lines which comprises a body adapted for mounting in such a supply line and having a supply passage for liquid, such passage having an inlet and an outlet communicating with said line, a valve reciprocatingly mounted in said body, said body also having a metering chamber and a discharge passage for a liquid sample, said valve having a passage placing said supply passage in communication with said metering chamber in one position thereof and placing said metering chamber in communication with said discharge passage in another position thereof, and means for effecting discharge of liquid in said metering chamber through said discharge passage during said last-mentioned position of said valve.

The invention will be described with reference to the accompanying drawing in which, FIGURE 1 is a sectional side elevation of a sampling device in accordance with the invention, and FIGURE 2 is a sectional side elevation of modified form of sampling device.

Referring to FIGURE 1, 1 is a metal body arranged for mounting in a liquid supply line 2 as by means of a threaded extension 3. Extension 3 has a U-shaped supply passage 4 therein and a pair of projecting tubes 5 and 6 mounted therein, such tubes being arranged to extend directly into the liquid passage in line 2. Tube 5 constitutes a liquid inlet and communicates with one end of passage 4. It has a bevelled end 7 to place its entrance in facing relation to the direction of liquid flow in line 2 as indicated by the arrow. It may also be provided with inlet orifices 8. Tube 6 constitutes a liquid outlet and leads from the other end of passage 4. It has a bevelled end 9 to place its discharge port in facing relation to the opposite direction of fluid flow.

As shown, passage 4 has parallel side sections 10 in respective alignment with tubes 5 and 6 and a connecting section 11. Body 1 has a cylindrical recess 12 extending across passage section 11 and opening into a chamber 13 provided with a closure plate 14. Recess 12 is arranged to receive a valve mechanism which includes a valve rod 15 reciprocatingly mounted in a tubular support 16 fixed within the recess. Valve rod 15 has a spool 17 and projects into chamber 13 wherein a spring 18, having one end seated upon support 16 and its other end seated upon a ring 19 carried by the rod, urges the rod in a direction towards the closure plate 14.

Recess 12 also contains a plurality of axially aligned packing rings 20 sealingly engaging valve rod 15 and supporting, in spaced relation to the wall of the recess and valve rod 15 a plurality of axially aligned tubular spacers 21. One of such spacers extends across passage section 11 and has openings 22 communicating with the passage 4 through annular space 23 between packers 20. Openings 22 also communicate with an annular space 24 between packers 20 whereby communication between passage sections 10 is never interrupted and thus liquid may circulate continuously through the passage 4.

Another of such spacers 21 is located opposite a sample discharge passage 25 in body 1 and has openings 26 communicating with such passage 25 through annular space 27 between packers 20. Openings 26 also communicate with an inner annular space 28 between packers 20.

An intermediate one of such spacers 21 is located opposite a metered sample receiving passage 29 in body 1 and has openings 30 communicating with such passage through annular space 31 between packers 20. Openings 30 also communicate with an inner annular space 32 between packers 20.

It will be apparent that, when valve rod 15 is reciprocated inwardly against the action of spring 18 to its innermost position, spool 17 will place annular spaces 24 and 31 and thus passages 4 and 29 in communication. It will also be apparent that, when valve rod 15 is reciprocated under the action of spring 18 to its outermost position, spool 17 will interrupt communication between passages 4 and 29 and place passages 29 and 25 in communication.

Means for reciprocating valve rod 15 against the action of spring 18 comprises a solenoid 33 mounted on plate 14 and having a plunger 34 engaging the end of valve rod 15.

Metered sample receiving passage 29 communicates with a metering sample receiving chamber 35. Means for ejecting the sample in chamber 35 through passages 29 and 25 when the latter are in communication comprises a piston 36 reciprocatingly mounted in support 37 in body 1 and having one end extending into chamber 35. Piston 36 also extends into chamber 13 and is held in retracted position with respect to chamber 35 by means of a spring 38 having one end seated on support 37 and its other end seated on a ring 39 carried by piston 36. A solenoid 40 mounted on plate 14 has a plunger 41 engaging end of piston 36 and energizable to reciprocate the piston against the action of spring 38 and thus eject the liquid from chamber 35. The solenoids 33 and 40 are contained within a housing 42 mounted on body 1.

Means are provided for varying the capacity of chamber 35 and thus the size of sample ejected therefrom per stroke of piston 36 and comprises a screw 43 mounted for screw-threaded adjustment in housing 42 and having one end in engagement with plunger 41 and a turning knob 44 on its other end.

Solenoid 33 is adapted to be periodically energized by any suitable means, not shown, in response to impulses provided by meter driven transmitters, time cycle controls, dump valve actuations, or other means applicable to any particular installation.

Energization of solenoid 40 is effected in response to actuation of a micro switch 45 having a trip 46 operable by solenoid plunger 34 when the latter moves into retracted position under the influence of spring 18.

Sample discharge passage 25 is connected to a sample receiving container 47 as by means of conduit 48.

Preferably, container 47 is of the flexible bag type and is formed of vapour proof materials. With such a container the sample can be easily and thoroughly mixed by flexing and shaking the bag.

Operation of the device will be clear from the foregoing description. Liquid from the main supply line flows continuously through passage 4. Each time solenoid 33 is energized, passages 4 and 29 are placed in communication to fill metering chamber 35 with a desired sample. On de-energization of solenoid 33, passages 29 and 25 are placed in communication and solenoid 40 energized to eject the metered sample into container 47.

FIGURE 2 illustrates a somewhat modified form of sampler for use with line pressures in excess of, say, 20 pounds. In this case, solenoid 40 is eliminated and the piston 36 provided with a somewhat more powerful spring 49. One end of spring 49 bears upon a shoulder 51 on piston 36 and the other end of spring 49 bears upon a lug 52 fixed to body 1 and through which the piston extends to provide a piston extension 50 within housing 42. As shown, the end of piston extension 50 is engageable with the end of adjustment screw 43. In operation, liquid entering chamber 35, being under relatively high pressure, will force piston 36 in one direction against the action of spring 49 until its extension 50 engages screw 43. Thereafter, when communication between chamber 35 and supply passage 4 is cut off and chamber 35 and discharge passage 25 placed in communication by movement of the rod 15, pressure on the liquid in chamber 35 will be removed and the spring 49 will move piston 36 in the other direction and discharge the sample supply of liquid in chamber 35 into discharge passage 25. It will be apparent that, by adjusting the position of screw 43, the backward stroke of the piston towards the screw will be varied thereby to vary the effective size of chamber 35 and therefore the size of the sample received thereby. It will also be apparent that the tension of spring 49 is such that pressure of the liquid entering the chamber 35 from the supply passage 4 will overcome such tension to perform a complete backward stroke of the piston as defined by its engagement with screw 43 and, following removal of such pressure by interruption of communication between supply passage 4 and chamber 35, will effect a complete forward stroke of the piston to fully eject the sample in chamber 35.

I claim:

1. A sampling device for a liquid supply line comprising a body having a constantly open supply passage therein, said passage having an inlet and an outlet, a tube connected to each of said inlet and said outlet and projecting outwardly from said body, for disposition in said line, said body having a cylindrical recess therein communicating at one end thereof with said passage, a sample receiving chamber, a sample receiving passage leading from said recess to said chamber, and a sample discharge passage leading from said recess, a valve spool member reciprocatingly mounted in said recess and having a first position placing said supply passage in communication with said sample receiving passage and said chamber while closing said discharge passage and a second position interrupting communication between said supply passage and said sample receiving passage and placing said sample receiving passage in communication with said discharge passage, means for reciprocating said valve spool member to place said member in said first and second positions, and a liquid ejection piston movable into said chamber in response to placing of said member in said second position.

2. A sampling device as defined in claim 1, said reciprocating means comprising a solenoid engaging said valve member to move said valve member into said first position and a spring engaging said valve member to move said valve member into said second position.

3. A sampling device as defined in claim 2, including a second solenoid having a plunger engaging said piston and energizable to perform an ejection stroke of said piston, and a spring for effecting a return stroke of said piston, said second solenoid being energizable in response to de-energization of said first solenoid.

4. A sampling device as defined in claim 1, including a spring on said piston and urging it in an ejection stroke direction, said spring being depressable in response to pressure of liquid in said chamber in said first valve position and being capable of exerting an ejection stroke on said piston on release of liquid pressure in said chamber in response to interruption of communication between said chamber and supply passage.

5. A sampling device as defined in claim 1, including means for varying the ejection stroke of said piston thereby to vary the size of liquid sample ejected from said chamber.

6. A sampling device as defined in claim 1, said supply passage being U-shaped and having a pair of substantially parallel side sections and a section connecting one of the pair of ends of said side sections, said valve spool member extending across said connecting section, said connecting section having an annular portion extending around said valve spool member.

References Cited in the file of this patent

UNITED STATES PATENTS

| | | |
|---|---|---|
| 1,852,445 | Calkins et al. | Apr. 5, 1932 |
| 1,966,712 | Fisher et al. | July 17, 1934 |
| 2,558,387 | Ray | June 26, 1951 |
| 2,872,817 | Pitts | Feb. 10, 1959 |